Patented July 12, 1938

2,123,855

UNITED STATES PATENT OFFICE 2,123,855

METHOD OF TREATING RUBBER COMPOSITION

Henry F. Palmer, Akron, Ohio, and George Willis Miller, Los Angeles, Calif., assignors to The Xylos Rubber Company, Akron, Ohio, a corporation of Ohio No Drawing. Application August 26, 1935, Serial No. 37,938

9 Claims. (Cl. 18—52)

This invention relates to methods of treating rubber compositions, and more especially it relates to the treatment of rubber compositions, such as devulcanized rubber scrap, which compositions require to be dried after such treatment.

According to the well-known alkali process of reclaiming rubber (Mark U. S. Patent #635,141), comminuted scrap material comprising vulcanized rubber and cotton cord or fabric is covered with a water solution of caustic soda (sodium hydroxide) and digested in an autoclave, whereby the cotton therein is eliminated and the rubber constituent devulcanized. The solution used in the alkali digesting process results in sufficient osmotic pressure to prevent excessive absorption of water into the rubber during devulcanization. It is necessary, however, that the alkali remaining in the reclaim after devulcanization as described be removed, since traces of the alkali in the rubber have an undue activating effect upon certain accelerators, such as mercapto-benzo-thiazole, used with the rubber in a subsequent vulcanizing operation. It is necessary, therefore, to subject reclaimed scrap to a pressure washing operation to remove the residual alkali therefrom. If this washing is effected with plain water so much of the latter is absorbed by the rubber that the drying thereof is rendered difficult. It is to the improvement of the pressure washing operation on reclaim rubber that this invention is directed.

The chief objects of this invention are to prevent the excessive absorption of water by rubber particles during pressure washing after devulcanization in an alkali medium; to reduce the time required for drying devulcanized rubber scrap and to render the operation less difficult; and to provide an improved method for accomplishing the foregoing objects.

It is found that the excessive swelling of rubber particles and the imbibition of water by the particles during pressure washing is greatly reduced by the addition of sodium chloride (NaCl), sodium sulphite ($Na_2SO_3$) or other material which when dissolved in the water used in the washing operation will result in increased osmotic pressure, with the result that excessive absorption of water by the rubber is prevented and subsequent drying of the rubber made less difficult.

The following comparative data obtained by experiment are presented to show the results of applicants' invention:

I. Three one-half inch cubes of reclaimed rubber were weighed and one placed in each of the following solutions:

1. 4% sodium hydroxide. (NaOH)
2. Distilled water
3. 4% sodium chloride. (NaCl)

The cubes were kept in the solutions for 17½ hours at 90° C. The cubes showed the following increases in weight due to the absorption of water:

|   | Percent |
|---|---------|
| 1 | 6.0     |
| 2 | 17.2    |
| 3 | 3.4     |

II. Cubes one-half inch in size were made by pressing together devulcanized whole tire scrap to simulate the lumps or agglomerated particles of rubber found in a digestion of rubber scrap. The cubes were treated as in Experiment I with the following respective increases in weight due to the absorption of water:

|   | Percent |
|---|---------|
| 1—4% sodium hydroxide | 49.5 |
| 2—Distilled water | 384.0 |
| 3—4% sodium chloride | 32.0 |

III. In order to determine if the use of sodium chloride would have any deleterious effect on the properties of reclaim or the composition in which it was incorporated, the following test was made.

A sample of reclaimed rubber that had been pressure washed in a 4% sodium chloride solution was digested for 3 hours in boiling water. Analysis showed the extract to contain 0.04% NaCl based on the weight of the reclaimed rubber. Another experiment, in which a known amount of NaCl was added to a finished reclaim showed that 33% of the salt could be removed by the 3-hour water digestion, so that at the most the reclaim could not contain more than 0.15% residual salt.

To determine the effect of sodium chloride in vulcanized rubber, concentrations ranging from 0.12% to 0.50% of the rubber content were added to a tread compound containing no reclaimed rubber. These concentrations of salt had no effect on normal or aged stress-strain figures as obtained both in the oxygen bomb and geer oven. Following are given the normal and aged tensile figures for the 75-minute cure which was judged to be the best cure:

75-minute cures in press at 260° F.

| Compound | NaCl rubber | Normal tensile lbs./sq. in. | Aged tensile 46 hrs. oxygen bomb | Percent depreciation in tensile | Aged tensile 14 days geer oven | Percent depreciation in tensile |
|---|---|---|---|---|---|---|
| | Percent | | | | | |
| 1 | 0 | 4390 | 2700 | 39 | 3555 | 19 |
| 2 | 0.50 | 4190 | 3080 | 26 | 3505 | 16 |
| 3 | 0.25 | 4250 | 2960 | 30 | 3450 | 19 |
| 4 | 0.12 | 4040 | 2820 | 30 | 3250 | 20 |

The foregoing tests show that sodium chloride used in the water for pressure washing of devulcanized rubber scrap greatly reduces the absorption of water by the rubber particles, and thus decreases the amount of water which necessarily must be driven off in the subsequent drying operation. Apparently this phenomenon is the result of increased osmotic pressure of the solution in contact with the rubber. The tests also show that the residual sodium chloride has no deleterious effect on vulcanized rubber products.

The invention is not limited wholly to the use of sodium chloride, for any material which when dissolved in water will increase the osmotic pressure will be effective in bringing about the same result. The use of sodium chloride is preferred because it is non-hygroscopic, will not harm the finished product and is low in cost.

In order to avoid corrosion of the metal treating tanks, conduits and other apparatus used in the washing of the reclaimed rubber, it is desirable to use materials which when placed in solution will give at least a slightly alkaline reaction, such as sodium sulphite ($Na_2SO_3$) and sodium carbonate ($Na_2CO_3$). Experience has shown that a mixture of equal parts of sodium chloride and sodium sulphite produces highly satisfactory results.

The invention is not limited to any specific type or strength of solution used, or its application to any type of scrap of vulcanized rubber.

What is claimed is:
1. The method of treating devulcanized rubber scrap to remove residual alkali therefrom which comprises pressure washing said scrap in the presence of an aqueous neutral or alkali solution of a sodium salt.
2. The method of treating devulcanized rubber scrap to remove residual alkali therefrom which comprises pressure washing said scrap in a water solution of a neutral salt.
3. The method of treating devulcanized rubber scrap to remove residual alkali therefrom which comprises pressure washing said scrap in a solution comprising water and a salt producing an alkali reaction in solution.
4. The method of treating devulcanized rubber scrap to remove residual alkali therefrom which comprises pressure washing said scrap in an aqueous solution of a neutral salt and an alkaline salt sufficient to produce a slightly alkaline reaction of the solution.
5. The method of treating devulcanized rubber scrap to remove residual caustic therefrom which comprises pressure washing said scrap in a solution of water and materials selected from the group consisting of sodium chloride, sodium sulphite and sodium carbonate.
6. The method of treating devulcanized rubber scrap to remove residual caustic therefrom which comprises pressure washing said scrap in a solution of water and sodium chloride.
7. The method of treating devulcanized rubber scrap to remove residual caustic therefrom which comprises pressure washing said scrap in a solution of water and sodium sulphite.
8. The method of treating devulcanized rubber scrap to remove residual caustic therefrom which comprises pressure washing said scrap in a solution of water and sodium carbonate.
9. The method of treating devulcanized rubber scrap to remove residual caustic therefrom which comprises pressure washing said scrap in a solution of water, sodium chloride, and sufficient sodium sulphite to produce an alkaline reaction in the solution.

HENRY F. PALMER.
GEORGE WILLIS MILLER.